P. A. CONTI.
WINDOW WIPER.
APPLICATION FILED FEB. 6, 1919.
1,349,118. Patented Aug. 10, 1920.
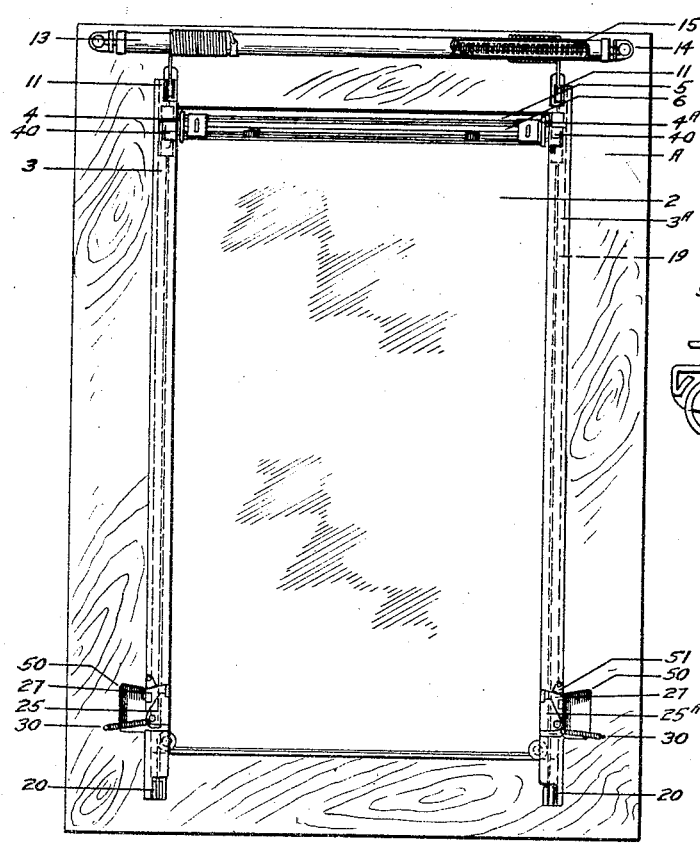
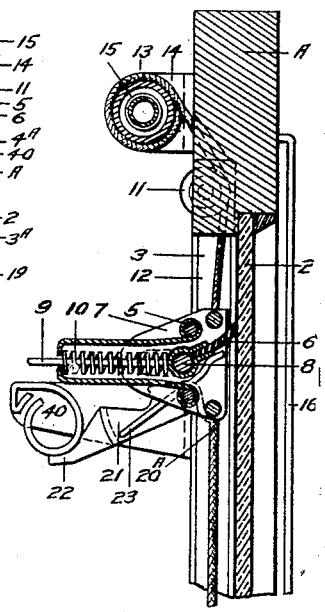
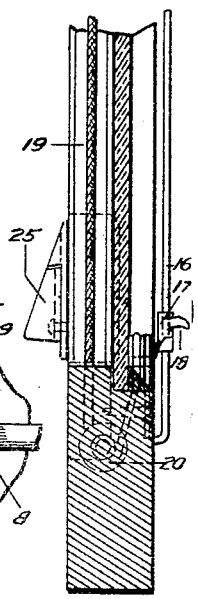
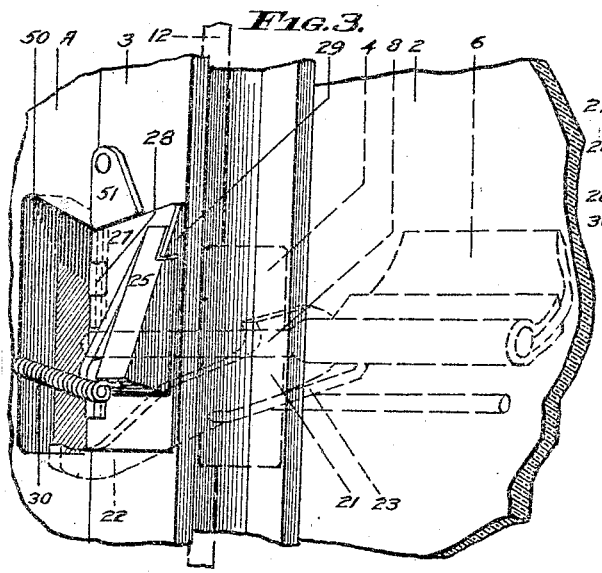
INVENTOR
*Pietro A. Conti*
BY *Strong & Townsend*
ATTORNEY

UNITED STATES PATENT OFFICE.

PIETRO A. CONTI, OF NEVADA CITY, CALIFORNIA.

WINDOW-WIPER.

1,349,118.   Specification of Letters Patent.   Patented Aug. 10, 1920.

Application filed February 6, 1919. Serial No. 275,330.

*To all whom it may concern:*

Be it known that I, PIETRO A. CONTI, a subject of the King of Italy, residing at Nevada City, in the county of Nevada and State of California, have invented new and useful Improvements in Window-Wipers, of which the following is a specification.

This invention relates to a window wiper.

One of the objects of the present invention is to provide a simple, compact, easily operated device adapted to be attached to the outlook window of locomotive cabs, electric street cars, automobile wind shields, etc., whereby the engineer or motorman may readily and thoroughly clean the exterior window surface, thus making it possible to quickly remove rain, fog, snow or sleet which usually collects in sufficient quantities to obstruct the vision through the window or shield. Another object of the invention is to provide a wiper which is adapted to extend crosswise of the exterior surface of the window and mounted to be moved up and down over said surface. Another object of the invention is to provide means interior of the window for transmitting movement to the wiper, and, in conjunction therewith, to provide automatically actuated means for maintaining the wiper in contact with the window surface during the downward movement and out of contact with the window surface during the upward movement. Further objects will hereinafter appear.

The invention consists of the parts and the construction, combination and arrangement of parts as will be hereinafter more fully described and claimed, having reference to the accompanying drawings, in which—

Figure 1 is a front view of a window showing the application of the invention.

Fig. 2 is an enlarged central vertical cross section of the window showing the invention employed.

Fig. 3 is a detail perspective view of the lower cam latch by which the wiper is elevated when moved in an upward direction.

Fig. 4 is another detail view of the lower cam latch showing it in the act of swinging out of the path of the wiper after it has elevated the same and while the wiper is moving upwardly.

Referring to the drawings in detail, A indicates the frame of a window and 2 the glass supported thereby. Secured to the frame in any suitable manner is a pair of channel-shaped track members disposed one on each side of the window, as shown at 3 and 3ª. Slidably mounted between the track members is a frame consisting of two sections 4 and 4ª which are tied together by means of rods 5. This frame is provided for the support of a squeegee or wiper 6 which is maintained in contact with the exterior surface of the window when the frame is moved in a downward direction and out of contact with the window surface when the frame is moved upwardly, as will hereinafter be described.

Formed on each frame member 4 and 4ª is an outwardly extending housing 7, and formed on each housing is a slot for the reception of a shaft 8 which carries the wiper. Secured to each end of the shaft and slidably mounted in the housings 7 is a guide rod 9, and surrounding each rod and interposed between the shaft 8 and the housing is a coiled spring 10. These coiled springs serve the function of normally retaining the wiper in contact with a window surface. The guide tracks 3, together with the frame supporting the wiper, are mounted on the exterior side of the window and it is therefore desirable to provide means interior of the window for transmitting an upward and downward movement to the same. This is accomplished in the following manner: Suitably journaled in the upper portion of the frame is a pair of rollers 11. These rollers are mounted in alinement with the guide tracks and are adapted to receive cords 12 which are secured to the frames 4 and 4ª at one end and to a spring-actuated roller 13 at the opposite end. The roller 13 is also secured on the exterior side of the window frame and is supported in journal brackets 14. Mounted interior of the roller is a spring 15 similar to that employed on a window shade roller, and, as said spring is secured at one end to a shaft which supports the roller and at the opposite end to the roller proper, it can readily be seen that revolving movement of the roller when the wiper frame is pulled in a downward direction will place the spring under tension, the tension being sufficient in the present instance to rewind the cords 12 and raise the wiper frame to the elevated position shown in Fig. 1. Manual means are provided for pulling the frame in the downward direction, while the roller serves the function of returning the frame to its normal upper position. Manually operated means is located on the interior side of the window and it consists of a rod 16 upon which is slidably mounted a bracket 17 provided with a finger grip 18. Secured to the bracket 17 is a pair of cords 19 which pass over guide pulleys 20 secured in the lower portion of the window frame. The cords are then secured to the lower side of the wiper frame, as shown at 20. An upward pull on the bracket 17 will therefore transmit a downward movement to the wiper frame, while the tension of the spring 15 in the roller will rewind the cords 12 and pull the wiper frame upwardly and return it to normal position.

One of the features of the present invention is the provision of means for maintaining the wiper in contact with the window surface during the downward movement of the frame supporting the same and for raising the wiper out of contact with the window during the upward movement of the frame. Means are provided for automatically performing these functions. This is accomplished in the following manner: Pivotally mounted on each wiper frame section 4 and 4ª is a pivotally mounted arm 21, on the forward face of which is formed a hook-shaped rest 22. Each arm is normally held in engagement with the shaft 8 by means of a spring 23, and it can therefore be seen that if the shaft 8 is forced outwardly in the slots to a point above the hook-shaped rests the arms will swing inwardly and engage the shaft and thereby hold the same in a raised position where the wiper will be out of contact with the window surface.

The means for forcing the shaft 8 outwardly comprises a pair of cam latches 25 and 25ª positioned adjacent the lower ends of the channel tracks 3 and 3ª. These latches are each pivotally attached, as at 26, to a plate 27, which, in turn, is hingedly secured, as at 28, to the window frame, each plate being provided with a stop member 29 which limits the swinging movement of the cam latches 25 as regards the tracks 3 and 3ª, that is, a spring 30 is connected with the lower end of each cam latch, thus normally retaining the free end of each latch in engagement with the stops 29 or in parallelism with the track members 3 and 3ª. The cam latches 25 and 25ª are directly in the path of the ends of the shaft 8 when the wiper frame is pulled downwardly. The ends of the shaft will therefore engage the surface of the cam latches 25 and 25ª and are therefore forced outwardly in the slots formed in the housing sections 7 and to a point where the arms 21 may swing inwardly and lock the shaft against return movement. The wiper frame during its downward movement passes beyond the cam latches 25 and it is therefore necessary to provide means for swinging the latches out of the path of the ends of the shaft 8 when the wiper frame is returned. This is accomplished by providing a pivotal mounting for each cam latch, as shown at 26 (see particularly Figs. 3 and 4). The ends of the shaft 8 will engage the latches 25 and merely swing the same about their pivotal connections 26, thereby permitting the wiper frame to return to its normal position without undue interference. The cam latches 25 and 25ª will, of course, return to the normal position or to a point where they will engage the stops 29 the moment the shaft 8 or the wiper frame supporting the same is passed as the springs 30 connected therewith will pull the cam latches back to normal position.

From the foregoing description it will be seen that means are provided for raising the shaft 8 and the wiper carried thereby to a point where the wiper will not engage the window surface and means have also been described which secure the shaft 8 and the wiper carried thereby in its elevated position. It is, however, necessary to provide means for releasing the shaft 8 when it reaches its normal position so that the wiper may again engage the window surface in readiness for the next operation of the wiper. This is accomplished by providing a pair of stationary stops, such as shown at 40. These are arranged one on each side of the window frame and in a position where they will engage the upper ends of the arms 21 when the wiper frame reaches its normal position, that is, engagement of the arms 21 with the stationary stop members 40 forces the arms 21 about their pivotal mountings downwardly or away from the shaft 8, thus disengaging the same and permitting the springs 10 to force the shaft downwardly in the slots to the position shown in Fig. 2. The wiper 6 will here engage the window surface and is therefore in readiness for the next operation.

From the foregoing description it will be seen that a simple mechanism is provided for removing rain, fog, snow or sleet from the exterior surface of the window disposed in front of the engineer, motorman or automobile driver, and it is simply necessary for him to take hold of the finger grip 18 and pull it upwardly to clean the window, the spring action upon the shaft operating to hold the wiper in yielding contact against the glass surface with sufficient pressure to clean the latter and at the same time with sufficient yielding action so as not to be rendered inoperative or too hard to work. In this way the difficulty of not being able to see through the front glass in stormy weather is effectually obviated.

It is evident that slight changes may be resorted to in the form and arrangement of the several parts described without departing from the spirit and scope of my invention; similarly, that the materials and finish of the several parts may be such as the experience and judgment of the manufacturer may dictate.

Again, it is obvious that while the device as here shown is attached to an ordinary window frame, such as is employed in locomotive cabs or street cars, it is obvious that it is equally applicable to the wind shield of an automobile or any other similar device. Where a device of this character is applied to the windows in a locomotive cab or in an electric street car, it is desirable to so arrange the mechanism that the window may be at least partly opened during nice weather. This may be accomplished in the present instance by folding the cam latches 25 so that they may lie flush with the exterior surface of the window frame A. This can be accomplished in the present instance as the plates 27 supporting the cam latches are hingedly secured to the frame, as at 28. Pockets 50 formed in the frame permit the plates 27 carrying the cam latches to be swung about the hinges 28 outwardly against the frame, thus placing the entire cam latch mechanism within the pockets. The cam latch mechanism when disposed in the pockets is retained therein by a latch 51 engageable with the rear side of the plate 27. The only obstruction presented which might interfere with the partial opening of a window of this character is thus removed as the cam latch mechanism is entirely disposed of. It is therefore possible to open the window at any time desired.

Having thus described my invention, what I claim and desire to secure by Letters Patent is:

1. A window cleaner comprising a movably mounted wiper frame, a wiper element carried by the frame for movement toward and from the window surface, trips arranged adjacent the limits of travel of the frame, one of said trips being mounted for movement by the wiper element from the path thereof, and means operable by the trips for alternately removing the wiper element from and applying it to the window surface.

2. A window cleaner comprising, in combination, a movable sash, a frame slidably mounted thereon, a wiper element mounted on the frame for movement to and from engagement with the window, means for holding the wiper element out of contact with the window on movement of said frame in one direction of travel, means for holding the wiper element in contact with the window during travel in the opposite direction, and a member mounted on the sash adjacent one limit of travel of the frame for disposing the wiper element to be retained by said first means out of contact with the window, said sash having a pocket into which said member is movable for being so disposed as to unobstruct the sash in its opening and closing movements.

3. A window cleaner comprising a pair of guide tracks, a frame slidably mounted on the tracks, a housing on the frame, a wiper element movable within the housing, a shaft movably supporting the wiper element in the frame and projecting beyond the ends thereof, means within the housing for urging the wiper to operative position, a spring-pressed latch on the frame for engaging the adjacent projecting shaft end to hold the wiper element in inoperative position, and means for disengaging the latch from the shaft at one limit of travel of the frame and for reëngaging the shaft with the latch at the opposite limit of travel of the frame.

4. A window cleaner comprising a wiper element, means for mounting the element for movement over a pane, means for holding the wiper element away from the pane, and a cam member normally in the path of the wiper element to effect engagement thereof with said means and pivoted to swing from the path of the engaged wiper.

5. A window cleaner comprising a pair of guide tracks positioned one on each side of the exterior side of a window, a frame slidably mounted between said tracks, a shaft carried by the frame and slidable outwardly with relation thereto, a wiper secured to the shaft, means for moving the frame and the shaft and wiper carried thereby up and down over the window surface between the tracks, means for maintaining the wiper in engagement with the window surface during the downward movement, means engageable with the shaft for moving the wiper out of engagement with the window, independent means for locking the shaft in its outward position and trip-operated means for releasing said locking mechanism to permit the shaft to return to its normal position and the wiper to engage the surface of the glass.

6. A window cleaner comprising a pair of guide tracks positioned one on each side of a window, a frame slidably mounted between said tracks, a shaft carried by said frame extending crosswise of the window and adapted to move outwardly between the guide tracks, slots in the frame guiding the shaft and permitting outward movement of the same, springs in the frame engaging the shaft and normally retaining it in engagement with the bottom of the slots, a wiper carried by the shaft extending across the window and normally engageable with the surface of the same, means for transmitting an upward and a downward movement to the frame, said springs adapted to maintain the wiper in engagement with the window surface during the downward movement of the frame, cam latches located adjacent the lower ends of the tracks adapted to force the shaft outwardly between the guide tracks and raise the wiper out of engagement with the window surface, latch arms carried by the frame adapted to engage the shaft and lock it against return movement and hold the wiper out of engagement with the window during the upward movement of the frame and means positioned adjacent the upper ends of the track members engageable with said latch arms to automatically engage the latch arms and release the shaft so that the wiper may again engage the window preparatory to the next operation of the wiper.

7. A window cleaner comprising a wiper frame mounted to traverse the window surface, a wiping element slidable on the frame for movement toward and from the window surface to and from operative position, and a catch pivoted to the frame for engaging the slidable element when retracted.

8. A window cleaner comprising a wiper frame mounted to traverse the window surface, a wiping element, a support for the latter slidable on the frame for movement toward and from the window surface to and from operative position, means for holding the element inoperative during movement of the frame in one direction, means disposed to disengage the first means from the element at one limit of travel, and cam means arranged at the opposite limit of travel and engageable with the support for sliding the element on the frame from the window surface to be engaged by the said first means.

9. A window cleaner comprising a wiper frame mounted to traverse the window surface, a wiping element slidable on the frame for movement toward and from the window surface to and from operative position, means for holding the element inoperative during movement of the frame in one direction, means disposed to disengage the first means from the element at one limit of travel, and means arranged at the opposite limit of travel for sliding the element on the frame from the window surface to be engaged by the said first means, said third means including a cam member mounted to be moved by the element from the path thereof when returning.

10. A window cleaner comprising a wiper frame mounted to traverse the window surface, a wiping element slidable on the frame for movement toward and from the window surface to and from operative position, means for holding the element inoperative during movement of the frame in one direction, means disposed to disengage the first means from the element at one limit of travel, and means arranged at the opposite limit of travel for sliding the element on the frame window surface to be engaged by the said first means, said third means including a cam member mounted to be moved by the element from the path thereof when returning, and a movable support for the cam member for moving the latter bodily from the path of the element.

In testimony whereof I have hereunto set my hand in the presence of two subscribing witnesses.

PIETRO A. CONTI.

Witnesses:
 JOHN H. HERRING,
 W. W. HEALEY.